Sept. 3, 1940.  E. SEIBOLD  2,213,349
HYDRAULIC POWER TRANSMISSION MECHANISM
Filed July 12, 1935  3 Sheets-Sheet 1

Sept. 3, 1940.　　　　　E. SEIBOLD　　　　　2,213,349
HYDRAULIC POWER TRANSMISSION MECHANISM
Filed July 12, 1935　　　3 Sheets-Sheet 2

Sept. 3, 1940.   E. SEIBOLD   2,213,349
HYDRAULIC POWER TRANSMISSION MECHANISM
Filed July 12, 1935   3 Sheets-Sheet 3

Patented Sept. 3, 1940

2,213,349

UNITED STATES PATENT OFFICE 2,213,349

HYDRAULIC POWER TRANSMISSION MECHANISM

Ernst Seibold, Heidenheim-on-the-Brenz, Germany, assignor to American Voith Contact Company, Inc., New York, N. Y.

Application July 12, 1935, Serial No. 31,081
In Germany July 12, 1934

19 Claims. (Cl. 74—189.5)

My invention relates to hydraulic power transmission mechanisms, or turbine mechanisms, for transmitting power from an engine to a driven part which may for instance be a driving axle of a rail or road vehicle.

It is an object of my invention to provide a mechanism of the kind referred to in which a favorable curve of tractive effort is obtained.

To this end I provide, in combination with a motor or engine, not less than three units for the circulation of a fluid, say, oil, the first unit being a transformer with guide vanes for starting, and the second and third units being coupling units for medium and high speed, respectively, each having a ratio which is different from that of the other unit.

In the drawings affixed to this specification and forming part thereof diagrams showing the tractive effort at the perimeter of the driving wheels, the power and the efficiency of an old mechanism, and, by way of comparison, similar diagrams of the novel mechanism, and various kinds of mechanisms embodying my invention, are illustrated diagrammatically by way of example.

In the drawings

Figure 1:
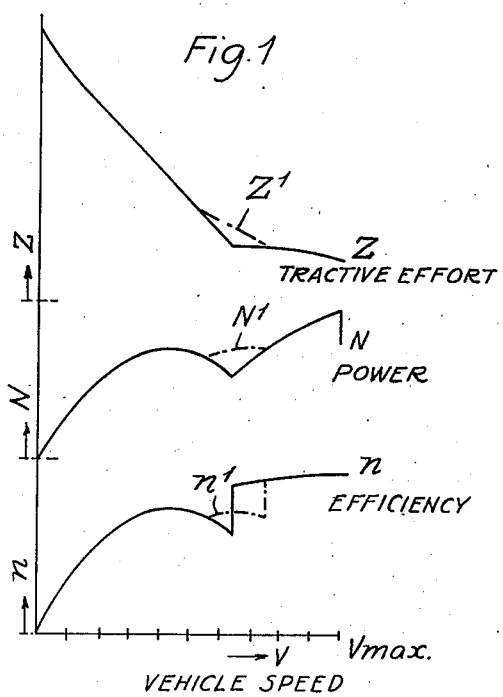
Fig. 1 shows the diagrams referred to for an old mechanism, plotted against speed.

Referring to the drawings, and first to Fig. 1, in mechanisms for driving vehicles, as heretofore designed, a turbine mechanism comprising a turbine transformer and a turbine coupling unit has been arranged between the motor or engine and a driving axle of the vehicle, if only one such axle was provided. If two driving axles were operated by a single engine or motor, the two axles were driven by a single coupling unit, or each axle had a coupling unit of its own.

The tractive effort Z, at the perimeter of the driving wheels, the power N available at the driving shaft, and the efficiency $\eta$ of an old mechanism, as described above, are shown in Fig. 1, plotted against the speed V of the vehicle. The curves, and quite particularly the power curve N distinctly show the weak point of the old mechanisms, i. e., a decrease of tractive effort, power, and efficiency in the region of medium speed, i. e., in the vicinity of the point where the transformer is cut out and the coupling unit is cut in.

It has already been suggested to eliminate this drawback by providing a second transformer for the medium speeds, but this solution is far from being satisfactory, since the second transformer is expensive and heavy, and it is difficult to arrange it in the mechanism, and since the improvement achieved is so small that it does not afford any compensation for the extra complication. Curves $Z'$, $N'$ and $\eta'$ show the insignificance of the increments obtained.

I am aware that mechanisms for driving vehicles with three or more units are old in the art. In such mechanisms, however, the units are two transformers and one coupling unit, or the transformer is so designed that it is filled at all speed ranges, i. e., that the power of the engine must be transmitted through this single transformer for all speed ranges.

Figure 2:
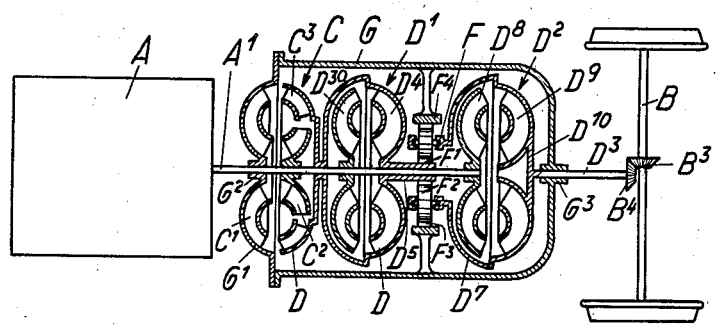
Fig. 2 is a horizontal axial section of a mechanism for operating a single driving axle of a railway vehicle, with an undivided driving shaft.

Referring now to the novel mechanism shown in Fig. 2, A is an engine or motor, A' is the driving shaft, to which the engine or motor imparts rotation, $D^3$ is the driven shaft, B is the driving axle of the vehicle, and $B^3$, $B^4$ is bevel gearing connecting the driven shaft to the driving axle.

By way of example the driving axle, or axles, is shown with flanged wheels for a vehicle running on rails, but I am obviously not limited to railway vehicles, but may as well apply the mechanism to road vehicles with plain unflanged wheels, or to ships or aircraft, etc.

The mechanism which comprises a torque transformer C, a coupling unit D' for medium speed and another coupling unit $D^2$ for high speed, is housed in a casing G with a detachable end plate G' at that end which faces the motor or engine A. The driving shaft A' is mounted to rotate in a central bearing $G^2$ of the end plate G'; the driven shaft $D^3$ is mounted to rotate in a bearing $G^3$ at the closed end of the casing G.

The torque transformer C is equipped with a guide apparatus C' at the inner side of the end plate G', and with an impeller C² which is keyed on the driving shaft A'. The driven part of the transformer is a set of vanes C³ in a rotary casing D, which is mounted to rotate on the shaft A' with a sleeve D⁵ at its rear end. This rotary casing surrounds the impeller D³⁰ of the medium-speed coupling unit D', which is keyed on the shaft A', and supports a set of vanes D⁴ as the driven part of the unit D'. A pinion F' on the rear end of sleeve D⁵ meshes with a planet reduction gearing F having a set of planet spur gears F². The planet spur gears F² mesh with an annular gear F³ which is fixed on a support F⁴ in the casing G. The shafts of the planet spur gears are mounted on another rotary casing D⁷ which forms part of the high-speed coupling unit D². An impeller D⁸ is keyed on the rear end of driving shaft A' within the casing D⁷, and vanes D⁹ are provided on the rear end plate D¹⁰ of the casing as the driven part of the unit. The rear end plate D¹⁰ of the unit D² is connected to the driven shaft D³.

The coupling units D' and D² have no guide apparatus and their ratio of reduction is correspondingly low, since the driven parts D⁴ and D⁹ are rotated at velocities, which are substantially equal to those of their impellers D³⁰ and D⁸. The transformer C, on the other hand, being equipped with a guide apparatus C', effects a substantial reduction of the velocity at which shaft A' rotates, and this low speed is further reduced by the reduction gearing F which is connected to the driven shaft D³ through the second rotary casing D⁹. The impeller D³⁰ of the second coupling unit D' imparts to the vanes D⁴ in the first rotary casing D a velocity which is substantially equal to that of the impeller D³⁰, but this velocity is transmitted to the driven shaft through reduction gearing F and therefore the coupling unit D' rotates the driven shaft at a medium velocity, i. e. at a velocity which is higher than the velocity imparted to the driven shaft by the transformer C through vanes C³, casing D and reduction gearing F, but lower than the velocity imparted to the driving shaft by the high-speed unit D².

The impeller C² of the torque transformer and the impellers D³⁰ and D⁸ of the coupling units, are keyed on the driving shaft A'. The first rotary casing D, by which the driven parts C³ and D⁴, respectively, of the transformer are positively connected with the medium-speed unit D', is old in the art. The two driven parts C³ and D⁴ which are connected by the first rotary casing D, operate the high-speed coupling unit D² through the reduction gearing F, as above described, the second rotary casing D⁷ which supports the driven part D⁹ of the unit D², being directly connected to the driven shaft D³. The reduction gearing F is shown as a planet gearing by way of example only. Obviously any other kind of reduction gearing might be provided instead. I am not limited either to the arrangement of the reduction gearing F between the two coupling units D' and D², shown in the drawings.

In operation the mechanism is started by the transformer C through C³, the first rotary casing D, the reduction gearing F, the second rotary casing D⁷ and the driven shaft D³, at high starting torque and low speed. Thereupon, the medium-speed coupling unit D' is cut in and, through D⁴, D, F, and D⁷, rotates the driven shaft D³ at a speed which is higher than the speed imparted by the transformer C, but lower than the speed imparted by the high-speed coupling unit D², through the reduction gearing F, whose ratio is so determined that it becomes active for the last descending portion of the power curve N (Fig. 3) of the transformer, and for the first ascending portion of the same curve of the high-speed coupling unit D². The peak of the power curve N² obtained by the medium-speed coupling unit D' and the reduction gearing F is positioned so favorably in the corresponding speed range, that the curve N² extends to a considerable extent beyond the descending and ascending portions of the curve N in the corresponding speed range. As the coupling units D' and D² have no guide apparatus, the velocity imparted to their driven parts is substantially equal to that of the impellers D³⁰ and D⁸. This is why the reduction gearing F is provided for imparting to the driven shaft D³ and to the driving axle B a speed which is appreciably less than that imparted by the high-speed coupling unit D².

Figure 3:
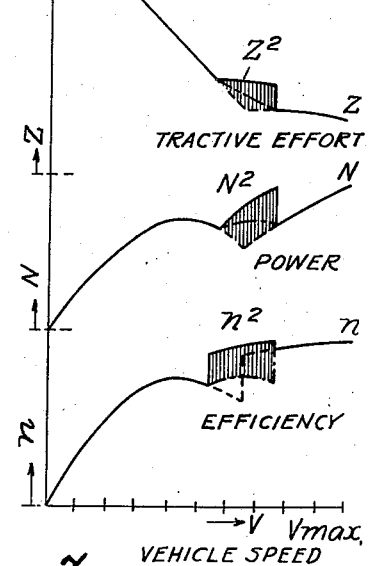
Fig. 3 shows diagrams illustrating the tractive effort, the power and the efficiency of a mechanism such as shown in Fig. 2.

The influence of the reduction gearing on the curves Z (tractive effort) and $\eta$ (efficiency) is equally favorable, as shown by the curves Z² and $\eta^2$ on the respective curves in Fig. 3. The result is that the high speed imparted by the unit D² at a lower ratio of reduction (since this unit has no guide apparatus) is attained in a much shorter time than heretofore, and, in particular, that comparatively steep gradients can be negotiated at considerably higher velocity than with a single transformer, or even with two transformers, by throwing in the medium-speed unit D' with its reduction gearing F.

The operation of the novel mechanism is as follows:

1. Starting the vehicle by the transformer C at high torque;
2. Throwing in the coupling unit D' with its reduction gearing F for medium speed;
3. Throwing in the coupling unit D² for high speed.

Figure 4:
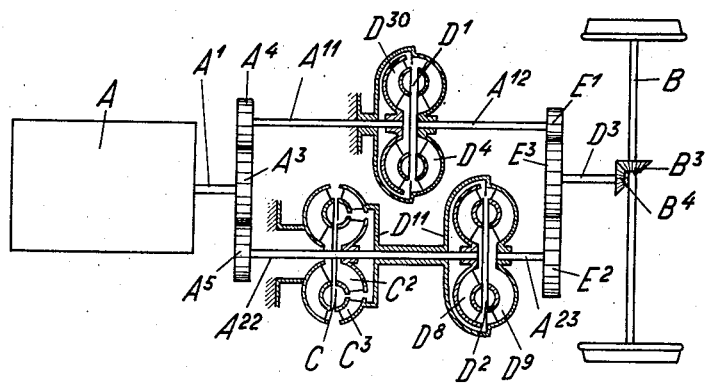
Fig. 4 is a horizontal axial section of a mechanism similar to the one illustrated in Fig. 2, but having two parallel subsidiary driving shafts instead of a single central shaft.

Referring now to Fig. 4, the driving shaft A' of the engine A is equipped with a spur gear A³ and, through pinions A⁴ and A⁵, drives, respectively, a subsidiary shaft A¹¹ and a subsidiary shaft A²² which are parallel to each other. The subsidiary shaft A²² supports the impeller C² of the transformer C and the impeller D⁸ of the high-speed coupling unit D², whose driven parts C³ and D⁹ are connected by a rotary casing D¹¹ on the shaft A²². A pinion E² on the rear end of a shaft A²³ on which the end wall of casing D¹¹ is keyed, meshes with a spur gear E³ on the driven shaft D³. The impeller D³⁰ of the medium-speed coupling unit D' is keyed on the other subsidiary shaft A¹¹ and its driven part D⁴ is keyed on a shaft A¹², which is in line with the shaft A¹¹ and connected to spur gear E³ on the driving shaft D³ by a pinion E'. The ratio is such that the speed imparted to the driving axle B by the pinion E' is lower than that imparted by the pinion E².

Without departing from my invention, the mechanism might also be so designed that the impeller D³⁰ of the coupling unit D' rotates more slowly than the impeller D⁸ of the coupling unit D². It is however preferable to operate both coupling units at the same velocity of their impellers, since in this case they are of identical design and the mechanism is simplified. For the sake of convenience the casing G has been omitted in Fig. 4.

In the operation of the arrangement according to Fig. 4, when power is transmitted from the engine to the driving axle B through coupling D¹ and gear E¹, a different rate of transmission is effected than in the case of transmission through coupling $D^2$ and gear $E^2$. While the transmission from $E^1$ to $E^3$ is provided as a step-down gear, the transmission from $E^2$ to $E^3$ may take place, for example, at the rate of 1:1.

During the start of the vehicle the transformer C is operated. When a certain speed has been reached, the transformer C is emptied and the coupling $D^1$ is caused to operate by filling the hydraulic circuit thereof. While coupling $D^1$ is operated, the power transmission from the engine to the driving axle is effected through the step-down gear $E^1$—$E^3$. In order to obtain the highest speed the coupling $D^2$ is switched in, causing the rate of transmission to be changed, for example, to 1:1.

Figure 5:
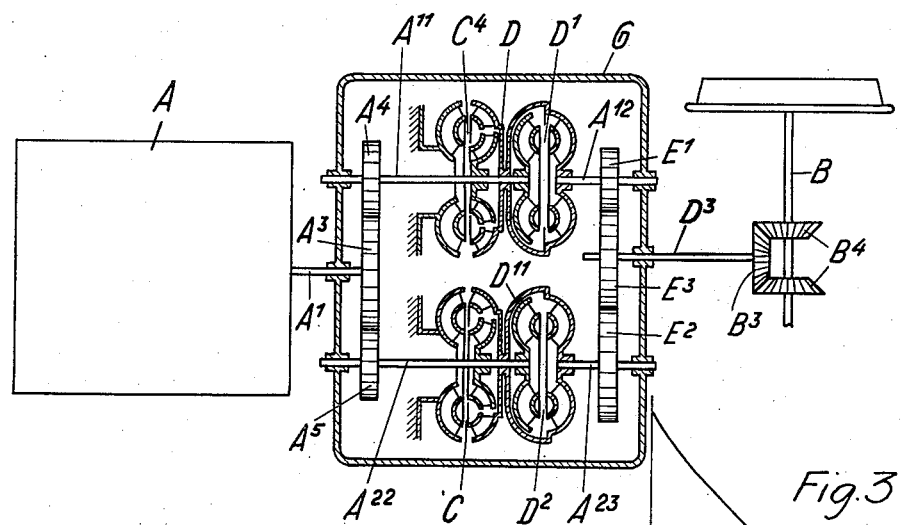
Fig. 5 is a similar view of a mechanism similar to the one illustrated in Fig. 4, but having two transformers instead of one.

Referring now to Fig. 5, the shafts $A'$, $A^{11}$, $A^{12}$, $A^{22}$ and $A^{23}$, and the several pinions and spur gears are provided as described with reference to Fig. 4, and mounted in suitable bearings of the casing G. The transformer C is also arranged as above described, but a second transformer $C^4$ is connected to the subsidiary shaft $A^{11}$ and operates the casing D, which surrounds the medium-speed coupling $D'$ and is keyed on the shaft $A^{12}$. This mechanism, consequently, has two transformers C and $C^4$ and the two coupling units $D'$ and $D^2$. The two transformers are so designed, and the ratios of pinions $E'$ and $E^2$ with respect to the spur gear $E^3$ on the driven shaft $D^3$ are such, that at equal velocity of its impeller each transformer exerts on the driving shaft $D^3$ the same tractive effort and both transformers can be connected in parallel during the starting period.

Figure 6:
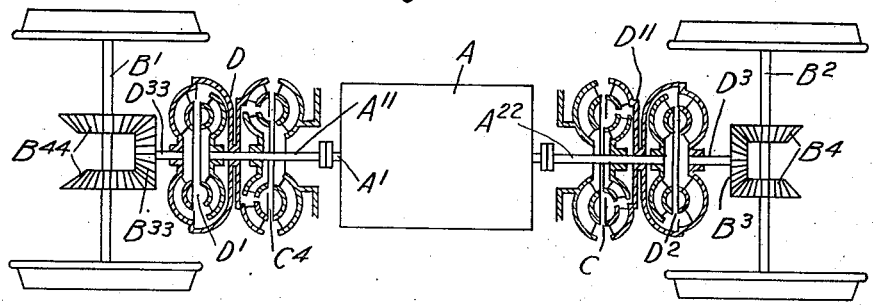
Fig. 6 shows the mechanism illustrated in Fig. 5 applied to a railway vehicle with two driving shafts.

Referring to Fig. 6, this mechanism is designed for the operation of two driving axles $B'$ and $B^2$. The driving axle $B^2$ is connected to the casing $D^{11}$ of the high-speed coupling unit $D^2$ through driven shaft $D^3$ and bevel gearing $B^3$, $B^4$. A similar arrangement with bevel gearing $B^{33}$, $B^{44}$ and a driven shaft $D^{33}$ is provided for the second transformer $C^4$ and the medium-speed unit $D'$.

In order to start the vehicle the two transformers are operated together and high tractive effort is exerted by the two driving axles. After a certain speed has been attained, the medium-speed coupling unit $D'$ is thrown in and operates the driving axle $B'$ at corresponding speed. At this speed range, the load on the driving axle $B'$ suffices to propel the vehicle. For still higher speeds the coupling unit $D^2$ is cut in to drive the axle $B^2$. The casing G has been omitted in Fig. 6, as in Fig. 4.

Figure 7:
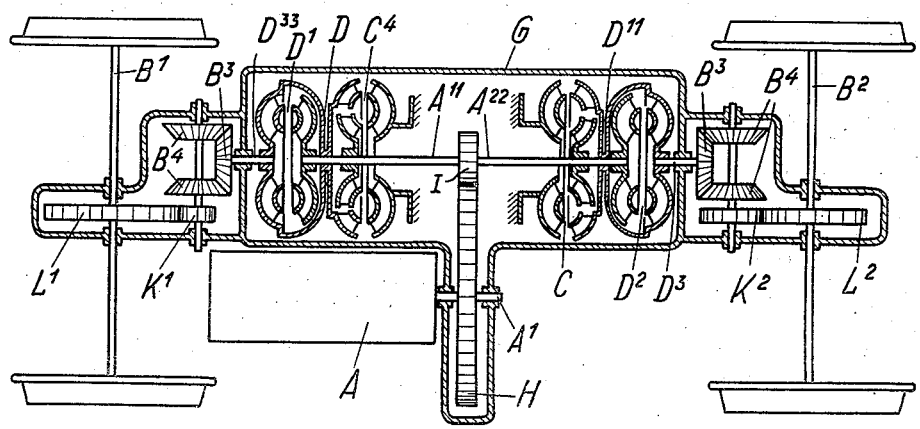
Fig. 7 shows a mechanism which is also designed for two driving axles of a railway vehicle, but has gearings between the motor or engine and the driving shafts and between each coupling unit and the driven shaft allotted thereto.

In Fig. 7, the arrangement of the transformers and coupling units is the same as described with reference to Fig. 6, but here the engine or motor A operates the shafts $A^{11}$ and $A^{22}$ through a spur gear H on its own shaft $A'$, and a pinion I on the shafts $A^{11}$, $A^{22}$, and the bevel gearings are connected to the respective axles $B'$ and $B^2$ through pinions $K'$, $K^2$ and spur gears $L'$, $L^2$. By these means the velocities of the transformers and coupling units become independent of the velocity of the engine or motor A, so that the transformers and units may be designed for high velocity and are of correspondingly small size.

It does not make a difference with respect to the scope of my invention whether the transformers and coupling units are driven directly from the engine or motor A, as in Figs. 3 and 6, and whether they operate the driving axle, or axles, directly or through simple gearings, or whether gearings are provided between the engine or motor and the units, or between the units and the driving axle, or axles, as shown in Figs. 4, 5 and 7. It is also within the scope of my invention to combine the transformer and one of the coupling units with a guide apparatus, which partakes in the rotation with the coupling unit. Reversing means may be inserted at any point of the power transmission from the engine or motor to the driving shaft, or shafts, so that the vehicle will run backwards when the reversing means is operated.

Whatever may be the design of the mechanism according to my invention, it must be such that the curves shown in Fig. 3 are obtained.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim in the present application to any modification not covered by these claims is expressly reserved.

I claim:

1. In an hydraulic power transmission mechanism in combination an engine, a driving shaft operatively connected to said engine, a driven member, a driven shaft operatively connected to said driven member, at least three hydraulic circuits comprising an hydraulic transformer and a plurality of coupling units designed for different speeds of the driven member, each coupling being adapted to operate while the other circuits are rendered inoperative, a driving part in said transformer and in each of said coupling units, said driving parts being positively connected to said driving shaft, a driven part in said transformer and in each of said coupling units, means for positively connecting the driven part in said transformer to the driven part in that one of said units which is designed for medium speed, means for positively connecting the driven part in that one of said units which is designed for high speed, to said driven shaft, and a reduction gearing operatively connecting the first-mentioned positive connecting means to said driven shaft.

2. In an hydraulic power transmission mechanism in combination an engine, a driving shaft operatively connected to said engine, a driven member, a driven shaft operatively connected to said driven member, at least three hydraulic circuits comprising an hydraulic transformer and a plurality of coupling units designed for different speeds of the driven member, each coupling being adapted to operate while the other circuits are rendered inoperative, a driving part in said transformer and in each of said coupling units, said driving parts being positively connected to said driving shaft, a driven part in said transformer and in each of said coupling units, means for positively connecting the driven part in said transformer to the driven part in that one of said units which is designed for medium speed, means for positively connecting the driven part in that one of said units which is designed for high speed, to said driven shaft, and a reduction gearing operatively connecting the first-mentioned positive connecting means to said driven shaft, said transformer being so designed that the peak of its tractive-effort curve is in the most favorable speed range with respect to said reduction gearing.

3. In an hydraulic power transmission mechanism in combination an engine, a driving shaft operatively connected to said engine, a driven member, a driven shaft operatively connected to said driven member, at least three hydraulic circuits comprising an hydraulic transformer and a plurality of coupling units designed for different speeds of the driven member, each coupling being adapted to operate while the other circuits are rendered inoperative, a driving part in said transformer and in each of said coupling units, said driving parts being positively connected to said driving shaft, a driven part in said transformer and in each of said coupling units, means for positively connecting the driven part in said transformer to the driven part in that one of said units which is designed for medium speed, means for positively connecting the driven part in that one of said units which is designed for high speed, to said driven shaft, and a reduction gearing including spur gears and pinions operatively connecting the first-mentioned positive connecting means to said driven shaft.

4. In an hydraulic power transmission mechanism in combination an engine, a driving shaft operatively connected to said engine, a driven member, a driven shaft operatively connected to said driven member, at least three hydraulic circuits comprising an hydraulic transformer and a plurality of coupling units designed for different speeds of the driven member, each coupling being adapted to operate while the other circuits are rendered inoperative, a driving part in said transformer and in each of said coupling units, said driving parts being positively connected to said driving shaft, a driven part in said transformer and in each of said coupling units, means for positively connecting the driven part in said transformer to the driven part in that one of said units which is designed for medium speed, means for positively connecting the driven part in that one of said units which is designed for high speed, to said driven shaft, and a reduction gearing of the planet gear type operatively connecting the first-mentioned positive connecting means to said driven shaft.

5. In an hydraulic power transmission mechanism in combination an engine, a driving shaft operatively connected to said engine, a driven member, a driven shaft operatively connected to said driven member, at least three hydraulic circuits comprising an hydraulic transformer and a plurality of coupling units designed for different speeds of the driven member, each coupling being adapted to operate while the other circuits are rendered inoperative, a driving part in said transformer and in each of said coupling units, the driving parts of said transformer and of that unit which is designed for high speed being positively connected to said driving shaft, another driving shaft operatively connected to said engine, the driving part of that unit which is designed for medium speed being positively connected to said other driving shaft, a driven part in said transformer and in each of said coupling units, means for positively connecting the driven part in said transformer to the driven part in that one of said units which is designed for high speed, and a reduction gearing operatively connecting the driven part of the unit designed for medium speed to said driven shaft.

6. In an hydraulic power transmission mechanism, an engine, a pair of driven members, two sets operatively connected to said engine, one of said sets comprising a transformer for lowest speed and a coupling unit for medium speed, the other set comprising a transformer, also for lowest speed, and a coupling unit for high speed, means for operatively connecting one of said sets to one of said driven members, and means for operatively connecting the other set to the other driven member.

7. In a vehicle and the like, an hydraulic transmission of the turbo-gear type comprising in combination an engine, a driven member and means including at least three hydraulic units constituting distinct speed changes for transmitting power from said engine to said driven member, at least one of said units being provided as torque transformer and adapted to impart low speed to said driven member during the start of the vehicle, two other units being provided as couplings, means operatively connecting one of said couplings with said driven member and adapted to impart medium speed thereto, and means operatively connecting the other coupling with said driven member so as to impart high speed thereto, a single one of said stages being operative at a time.

8. An hydraulic transmission of the turbo-gear type comprising in combination an engine, at least one driven member, and means operatively connecting said engine with said driven member and including at least one hydraulic torque transformer designed to form a low speed stage, an hydraulic coupling and a reduction gearing arranged for cooperation with said coupling so as to form a medium speed stage, and another hydraulic coupling operatively connected with said driven member forming a high speed stage, each coupling being adapted to operate while the other units are rendered inoperative.

9. An hydraulic transmission of the turbo-gear type comprising in combination an engine, at least one driving shaft and at least one driven member, and means operatively connecting said driving shaft with said driven member and comprising at least one torque transformer including an impeller operatively connected with said driving shaft and a secondary member driven at low speed by said impeller and operatively connected to said driven member, an hydraulic coupling including an impeller operatively connected with said driving shaft and a secondary coupling member, a reduction gearing operatively connecting said secondary coupling member with said driven member so as to impart medium speed to said driven member, and another hydraulic coupling including an impeller connected with said driving shaft and a secondary coupling member operatively connected with said driven shaft so as to impart high speed thereto, each coupling being adapted to operate while the other units are rendered inoperative.

10. In an engine-driven vehicle, a driving element connected to the engine, a driven element, a pair of hydraulic couplings and a hydraulic torque converter interposed between said driving and driven elements and having impellers and runners, means for connecting said impellers to said driving element, the runners of said torque converter and of one of said couplings being interconnected by a common structure, means for connecting said structure to said driven element at one speed ratio, and means for connecting the runner of the other coupling to said driven element at a different speed ratio.

11. In an engine-driven vehicle, a driving element connected to the engine, a driven element, a hydraulic torque converter and a pair of hydraulic couplings interposed between said driving and said driven elements and having impellers and runners, said impellers being mounted upon a common agency for rotation in unison, the runners of said torque converter and one of said couplings being interconnected by a common structure, means for connecting said structure to said driven element at one speed ratio, and means for connecting the runner of the other coupling to said driven element at a different speed ratio.

12. In an engine-driven vehicle, a driving element connected to the engine, a driven element, a hydraulic coupling and a hydraulic torque converter interposed between said driving and driven elements and having impellers and runners, means for connecting said impellers to said driving element, a change speed gear for connecting one of said runners to said driven element, and a second change speed gear of a different speed ratio for connecting the other runner to said driven element.

13. In an engine-driven vehicle, a driving element connected to the engine, a driven element, a pair of hydraulic couplings and a hydraulic torque converter interposed between said driving and driven elements and having impellers and runners, means for connecting said impellers to said driving element, and change speed means for independently connecting the runner of one of said hydraulic couplings to said driven element at a different speed ratio from the runners of the other hydraulic coupling and the torque converter.

14. In an engine-driven vehicle, a driving element connected to the engine, a driven element, a hydraulic coupling and a hydraulic torque converter interposed between said driving and driven elements and having impellers and runners, a change speed gearing assembly for connecting one of said runners to said driven element, and a second change speed gearing assembly of a different speed ratio for connecting the other runner to said driven element.

15. In an engine-driven vehicle, an engine-driven shaft means, a pair of hydraulic couplings and a hydraulic torque converter having impellers and runners, said impellers being mounted upon said engine-driven shaft means for rotation in unison therewith, a pair of output shafts, the runner of one hydraulic coupling being connected to one output shaft and the runners of the torque converter and the other hydraulic coupling being connected to the other output shaft, a propelling shaft, and means for connecting said output shafts to said propelling shaft at different speed ratios.

16. In an engine-driven vehicle, an engine-driven shaft means, a pair of hydraulic couplings and a hydraulic torque converter having impellers and runners, said impellers being mounted upon said engine-driven shaft means for rotation in unison therewith, a pair of output shafts, the runner of one hydraulic coupling being connected to one output shaft and the runners of the torque converter and the other hydraulic coupling being connected to the other output shaft, a propelling shaft, and separate change speed devices for connecting said output shafts to said propelling shaft at different speed ratios.

17. In an engine-driven vehicle, an engine-driven shaft means, a pair of hydraulic couplings and a hydraulic torque converter having impellers and runners, said impellers being mounted upon said engine-driven shaft means for rotation in unison therewith, a pair of output shafts, the runner of one hydraulic coupling being connected to one output shaft and the runners of the torque converter and the other hydraulic coupling being connected to the other output shaft, a propelling shaft, and separate change speed gearing assemblies for connecting said output shafts to said propelling shaft at different speed ratios.

18. In an engine-driven vehicle, a driving element connected to the engine, a driven element, at least three hydraulic power transmitters interposed between said driving and driven elements and having impellers and runners, means for connecting said impellers to said driving element, said hydraulic power transmitters being arranged in two groups, and means for operatively connecting each group to said driven element through reduction gearing of different speed ratios arranged to drive said driven element in the same direction.

19. In an engine-driven vehicle, an engine-driven shaft means, a pair of hydraulic couplings and a hydraulic torque converter having impellers and runners, said impellers being mounted upon said engine-driven shaft means for rotation in unison therewith, a pair of output shafts, the runner of one hydraulic coupling being connected to one output shaft and the runners of the torque converter and the other hydraulic coupling being connected to the other output shaft, a propelling shaft, and means for connecting said output shafts to said propelling shaft at different speed ratios.

ERNST SEIBOLD.